United States Patent [19]

Murakami et al.

[11] Patent Number: 4,580,741
[45] Date of Patent: Apr. 8, 1986

[54] LINE GUIDE HOLDER FOR A DOUBLE BEARING REEL

[75] Inventors: Hideo Murakami; Takehiro Kobayashi, both of Hiroshima, Japan

[73] Assignee: Ryobi Ltd., Fuchu, Japan

[21] Appl. No.: 562,000

[22] Filed: Dec. 16, 1983

[30] Foreign Application Priority Data

Dec. 26, 1982 [JP] Japan ............................ 57-196800[U]

[51] Int. Cl.$^4$ ....................... A01K 89/04; B65H 57/28
[52] U.S. Cl. .................... 242/84.42; 242/158.3
[58] Field of Search ................. 242/84.42, 84.41, 84.4, 242/158.3

[56] References Cited

U.S. PATENT DOCUMENTS

| | | | |
|---|---|---|---|
| 752,786 | 2/1904 | Leaver | 242/84.21 |
| 795,648 | 7/1905 | Richardson | 242/84.42 |
| 905,329 | 12/1908 | Krause | 242/84.42 |
| 2,639,870 | 5/1953 | Graham | 242/84.42 |
| 3,171,609 | 3/1965 | Baenziger | 242/84.42 |
| 3,624,798 | 11/1971 | Fleischer | 242/84.41 |

FOREIGN PATENT DOCUMENTS

| | | | |
|---|---|---|---|
| 2650727 | 10/1977 | Fed. Rep. of Germany | 242/84.42 |
| 2850060 | 6/1979 | Fed. Rep. of Germany | 242/89.42 |
| 127528 | 2/1950 | Sweden | 242/84.41 |

Primary Examiner—Stuart S. Levy
Assistant Examiner—Joseph J. Hail, III
Attorney, Agent, or Firm—Finnegan, Henderson, Farabow, Garrett & Dunner

[57] ABSTRACT

A line guide holder having a level winding mechanism for a double bearing fishing reel comprising reel body in which a spool for a fishing line is rotatably supported. A cam pawl holder is provided ahead of the spool for holding a cam pawl provided on the level wind mechanism, and is supported slidably along a guide rod on the reel body. An elongated line holder member is connected to the cam pawl holder member, and extends forwardly thereof. The line holder member has a guide for the fishing line at its free end, and is rotatable about the cam pawl holder member into a folded position close to the spool.

5 Claims, 5 Drawing Figures

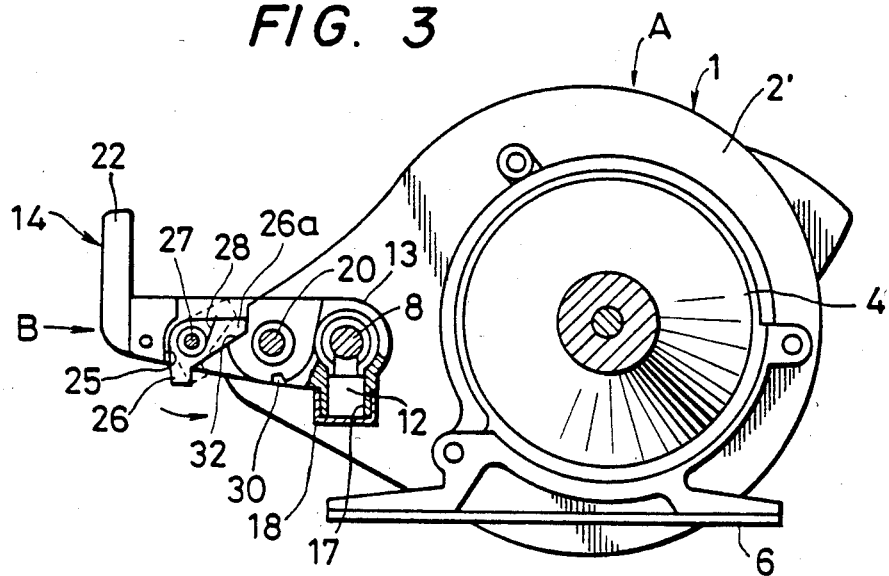
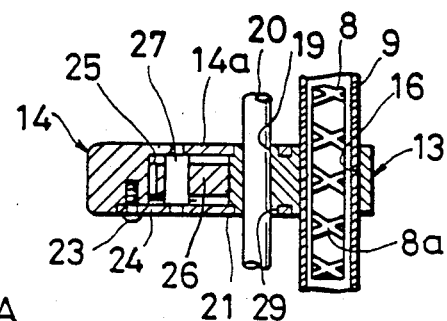
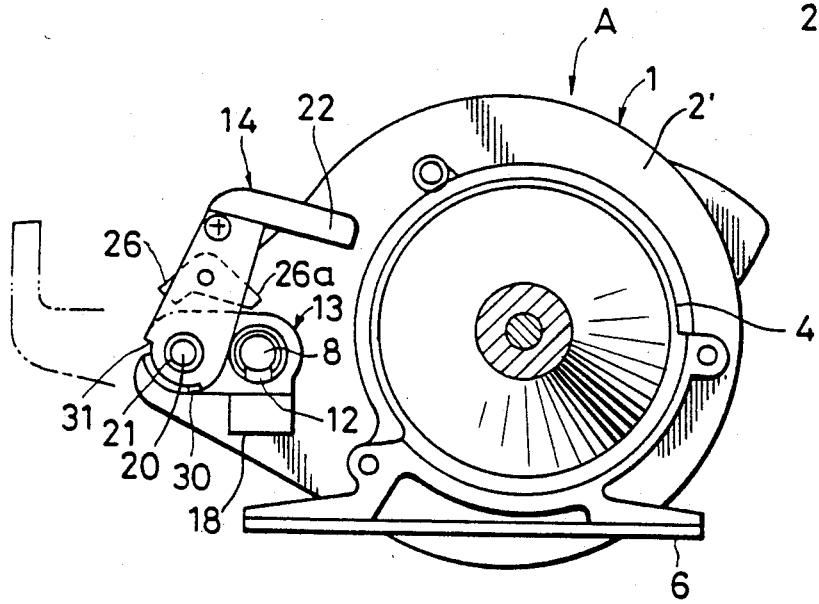

LINE GUIDE HOLDER FOR A DOUBLE BEARING REEL

FIELD OF THE INVENTION

This invention relates to a line guide holder for a double bearing reel for fishing, and more particularly, to a line guide holder provided with a level winding mechanism.

BACKGROUND OF THE INVENTION

In a double bearing reel for fishing, it has been known to use a line guide holder provided with a level winding mechanism. The level winding mechanism includes a traverse cam which reciprocates a line guide horizontally to effect the horizontal and uniform winding of a fishing line on a spool. It is effective for preventing the backlashing of the line when it is unwound. When the line is unwound, however, the line guide holders of the prior art bend the line and create frictional resistance which results in a reduction in the distance of a throw or cast. The line also has a great resistance when it is wound, and requires a large force for winding. The friction is liable to damage the line. Thus, line guide holders of the past have not performed entirely satisfactorily.

SUMMARY OF THE INVENTION

In view of this background, it is an object of the present invention to provide a line guide holder for a fishing reel which does not create any substantial frictional resistance to a fishing line when it is wound or unwound.

Another object of the present invention is a line guide holder which can be folded into a compact form when it is not in use.

Still another object of the present invention is a line guide holder which is simple in construction and easy and inexpensive to manufacture.

These and other objects are accomplished in a double bearing fishing reel having a reel body rotatably supporting a line spool and a level winding mechanism by a line guide holder comprising an elongated line holder member having a first end remote from the line spool for guiding a fishing line toward the line spool and a second end, traverse means for reciprocating the line holder member across the line spool for the uniform winding of fishing line on the line spool, and means for displacing the line holder member between an operative, extended position and a storage, folded position.

BRIEF DESCRIPTION OF THE DRAWINGS

These and other objects, features, and advantages of the present invention, as well as the invention itself, will become more apparent to those skilled in the art when considered in the light of the accompanying drawings wherein:

FIG. 3 is a view similar to FIG. 2, but showing the line guide holder partly in section;

FIG. 4 is a sectional view taken along the line IV—IV of FIG. 2;

FIG. 5 is a side elevational view of the reel of FIG. 1 showing the line guide holder in its folded position.

DETAILED DESCRIPTION OF THE PREFERRED EMBODIMENT

Figure 1:
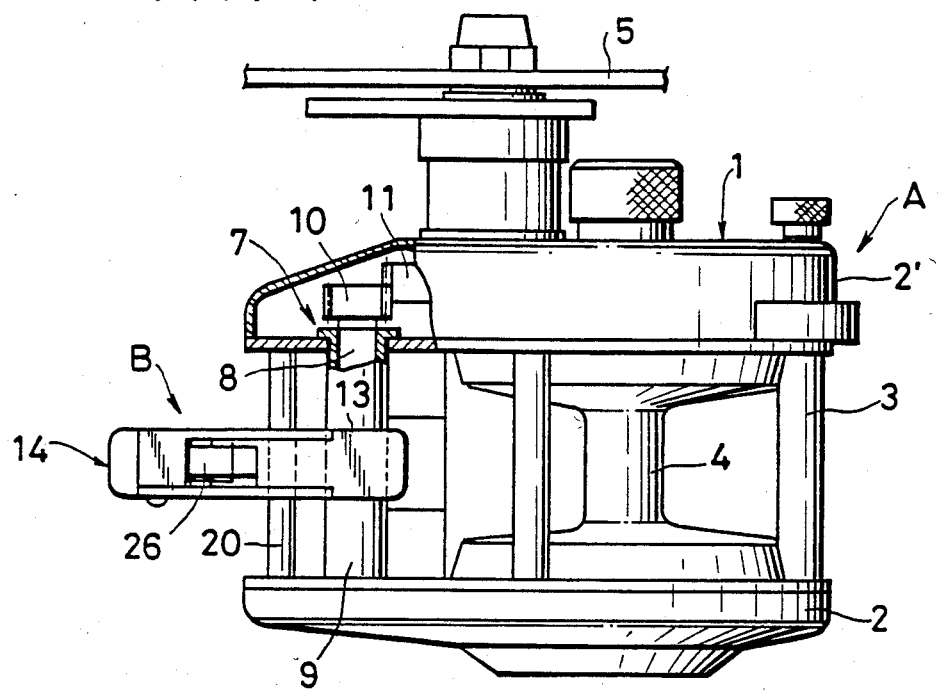
FIG. 1 is a top plan view of a double bearing reel provided with a line guide holder embodying this invention.
Figure 2:
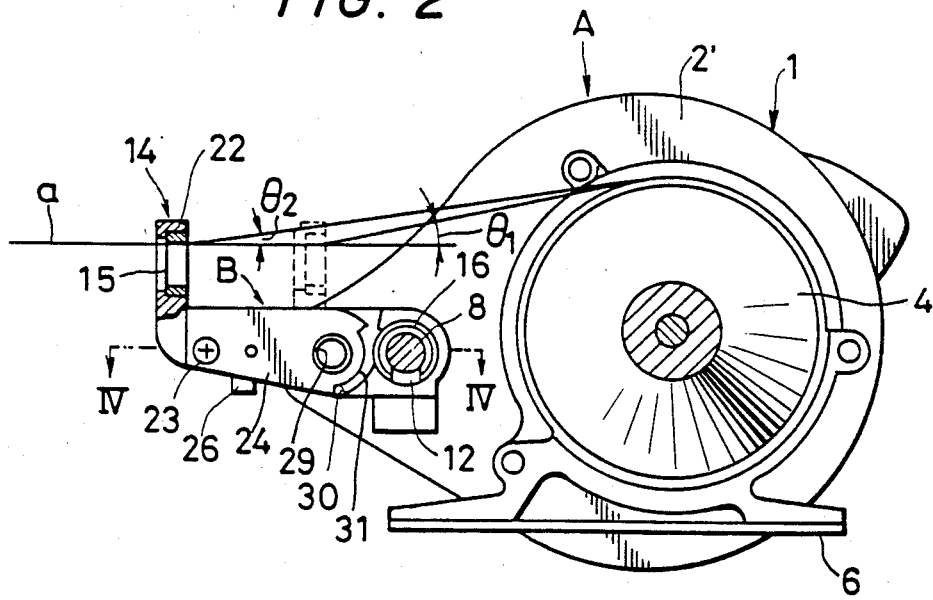
FIG. 2 is a side elevational view of the reel shown in FIG. 1.

A double bearing reel is generally shown at A in FIGS. 1 and 2, and comprises a reel body 1 formed by a pair of side frames 2 and 2', a plurality of supporting bars 3 provided therebetween, and a fishing rod support 6. A line spool 4 is rotatably supported between the side frames 2 and 2'. One of the side frames 2' is provided with a speed-increasing gear, a clutch, and a mechanism for preventing reverse rotation, which are not shown, and a handle 5. The handle 5 is rotatable to rotate the spool 4 in either direction.

A level winding mechanism 7 is provided in front of the spool 4, and includes a traverse cam 8 which is rotatably disposed in a guide tube 9 extending between the frames 2 and 2'. The cam 8 is provided at one end thereof with a gear 10 meshing with a drive gear 11 which is rotatable by the handle 5 to rotate the cam 8. The cam 8 has a cam groove in which a cam pawl 12 is reciprocable with a line guide holder so that a fishing line a may be uniformly wound on the spool 4.

The line guide holder of this invention is generally shown at B, and comprises a cam pawl holder 13 holding the cam pawl 12, and an elongated, foldable line holder member 14 for the fishing line a supported rotatably on the cam pawl holder 13 and projecting beyond its front end. The line holder member 14 has a guide hole 15 for the fishing line a.

For comparison purposes, a conventional line guide holder is shown by broken lines in FIG. 2, and has a guide holder member located close to the spool. In the present invention, the fishing line a is bent at the line holder member 14, therefore its angle $\theta_2$ is smaller than the angle $\theta_1$ at which the fishing line is bent in the conventional device because the line holder member 14 is elongated. The line holder member 14 is foldable toward the spool 4 when not in use, as shown in FIG. 5.

The cam pawl holder 13 has a guide hole 16 at its base end. The guide tube 9 extends through the guide hole 16 so that the cam pawl holder 13 is slidable along the guide tube 9. The cam pawl holder 13 is also provided with a pawl hole 17 which is connected with the guide hole 16. The cam pawl 12 is situated in the pawl hole 17, and the pawl hole 17 has an opening closed by a threaded cover 18, as shown in FIG. 3.

The cam pawl 12 is slidably engaged in the cam groove 8a of the traverse cam 8. The cam pawl holder member 13 is also provided at its front end with a hole 19 extending in parallel to the guide hole 16. A guide rod 20 extends between the side frames 2 and 2' parallel to the traverse cam 8. The guide rod 20 extends through the hole 19, so that the cam pawl holder member 13 is slidable along the guide rod 20. The cam pawl holder member 13 is, thus, reciprocable along the axis of the spool 4 if the cam 8 is rotated. A pair of short bearings 21 are provided symmetrically at the opposite edges of the hole 19, and a stop 30 is provided on one side of the bearings 21.

The line holder member 14 is L-shaped in side elevation, and its front end has an upright line guide 22 in which the guide hole 15 for the fishing line a is provided. Its horizontal rear portion is hollow toward its rear end, as shown in FIG. 4. It has a hollow space 25 defined by a sidewall 14a, and a side plate 24 secured by a screw 23 to close a side opening. A pawl 26 is provided in the hollow space 25, and is rotatable about a pawl shaft 27. The pawl 26 has one end projecting outwardly of the hollow space 25, and is urged by a spring 28 clockwise in FIG. 3.

The sidewall 14a and the side plate 24 are provided with holes 29 at the rear ends thereof. The bearings 21 on the cam pawl holder 13 are received in the holes 29, so that the line holder member 14 is rotatable about the bearings 21 into its folded position. The line holder member 14 is provided at its rear end with an arcuate recess 31 in which the stop 30 on the cam pawl holder 13 is received. The recess 31 has an arcuate length which defines the angle at which the line holder member 14 is folded. The cam pawl holder 13 has a shoulder 32 at its front end, and the other end 26a of the pawl 26 rests on the shoulder 32, as shown in FIG. 3.

The line holder member 14 is rotatable about the bearings 21 on the cam pawl holder 13 between its substantially horizontally extending position as shown in FIGS. 2 and 3, and its folded position as shown in FIG. 5. The angle of its rotation is defined by the stop 30 in the recess 31. The engagement of the pawl end 26a with the shoulder 32 by the spring maintains the line holder member 14 in its horizontally extending position, so that it may not be folded when it is being wound or unwound. If the outwardly projecting end of the pawl 25 is turned in the direction of an arrow in FIG. 3, the other end 26a thereof is disengaged from the shoulder 32, so that the line holder member 14 may be rotatable clockwise into folded position as shown in FIG. 5.

The angle at which the fishing line a is bent by the line guide 22 is considerably smaller than in the conventional device. This means a great reduction in the frictional resistance imposed by the line guide 22 on the fishing line being wound or unwound. Therefore, an improved line winding efficiency and an increased throwing distance can be obtained.

As the line holder member 14 can be folded into a compact form, the fishing reel is convenient for transportation, and there is no fear of the line holder being damaged by interference with another object. The line guide holder of this invention, which comprises the cam pawl holder and the line holder member is simple in construction, and easy and inexpensive to manufacture.

While the salient features of the invention have been described with reference to the drawings, it should be understood that the preferred embodiment described herein is susceptible of modification and alteration without departing from the spirit and scope of the following claims.

What is claimed is:

1. In a double bearing fishing reel having a reel body rotatably supporting a line spool and a level winding mechanism, a line guide holder comprising:
   an elongated line holder member having a first end remote from the line spool for guiding a fishing line toward said spool and a second end;
   traverse means connected to said second end of said line holder member for reciprocating said line holder member along a first axis and across the line spool for the uniform winding of fishing line on the line spool, said traverse means including a cam pawl and a cam pawl holder for securing said cam pawl to the level winding mechanism; and
   means for displacing said line holder member between an operative, extended position and a storage, folded position, said displacing means being rotatably positioned about a second axis spaced from and substantially parallel to said first axis of said reciprocating line holder, said displacing means including a pivot for rotably connecting said line holder member to said cam pawl holder, said pivot including a guide rod mounted on said reel body for rotatably supporting said line holder member, said guide rod preventing said cam pawl holder from rotation, while permitting said cam pawl holder to reciprocate in a direction parallel to the axis of said line spool.

2. A line guide holder according to claim 1 wherein said traverse means comprises:
   a guide tube mounted on said reel body parallel to the longitudinal axis of the line spool and parallel to said guide rod for slidably supporting said line spool holder proximate the line spool.

3. A line guide holder according to claim 2 wherein said line holder member includes a arcuate recess extending about said pivot and said cam pawl holder includes a stop positioned in said recess to limit the degree of rotation of said line holder member about said pivot.

4. A line guide holder according to claim 2 further including:
   a pawl shaft mounted in said line holder member parallel to said guide rod; and
   a line holder pawl rotatably mounted on said pawl shaft for locking said line holder member in said extended position.

5. A line guide holder for use in a double bearing fishing reel having a reel body rotatably supporting a line spool and a level winding mechanism, the line guide holder comprising:
   a cam pawl;
   a guide rod connected to said reel body and parallel to the line spool;
   a cam pawl holder for slidably mounting said cam pawl on said guide rod; and
   an elongated line holder member having a first end rotatably mounted on said cam pawl holder to enable rotation between an extended, operative position and a folded, storage position and a second end, said second end including an aperture adapted to guide a fishing line inserted therethrough;
   a pawl shaft mounted in said line holder member and parallel to said guide rod; and
   a line holder pawl rotatably mounted on said pawl shaft for locking said line holder member in said extended position.

* * * * *